(12) United States Patent
Talbot

(10) Patent No.: US 6,962,040 B2
(45) Date of Patent: Nov. 8, 2005

(54) SICKLE KNIFE WITH DOUBLE OVERLAPPING OUT OF PHASE SICKLES

(75) Inventor: Francois R. Talbot, Winnipeg (CA)

(73) Assignee: MacDon Industries Ltd., Manitoba (CA)

(*) Notice: Subject to any disclaimer, the term of this patent is extended or adjusted under 35 U.S.C. 154(b) by 19 days.

(21) Appl. No.: 10/808,316

(22) Filed: Mar. 25, 2004

(65) Prior Publication Data

US 2004/0216440 A1 Nov. 4, 2004

Related U.S. Application Data

(60) Provisional application No. 60/466,781, filed on May 1, 2003.

(51) Int. Cl.[7] ............................................. A01D 34/135
(52) U.S. Cl. ............................. 56/297; 56/259; 56/275
(58) Field of Search ........................... 56/259, 275, 297, 56/298, 299, 307, 257, 264, 242

(56) References Cited

U.S. PATENT DOCUMENTS

| 680,247 A | * | 8/1901 | Hart | 56/275 |
| 880,771 A | * | 3/1908 | Bacon | 56/275 |
| 2,569,507 A | * | 10/1951 | Von Schlegell | 60/543 |
| 2,664,690 A | * | 1/1954 | Huddle et al. | 56/297 |
| 2,823,506 A | * | 2/1958 | Irving | 56/16.2 |
| 3,017,736 A | * | 1/1962 | Hill | 56/297 |
| 4,387,554 A | * | 6/1983 | Bedogni | 56/296 |
| 4,660,361 A | * | 4/1987 | Remillard et al. | 56/297 |

* cited by examiner

Primary Examiner—Robert E. Pezzuto
Assistant Examiner—Meredith C Petravick
(74) Attorney, Agent, or Firm—Adrian D. Battison; Micharl R. Williams; Ryan W. Dupuis

(57) ABSTRACT

A sickle knife system includes two reciprocating sickles each cooperating the same fixed knife guards and each extending across the full width of the cutter bar. The guards have slots approximately twice the height of the guard of a conventional single sickle arrangement so that the two sickles can be run one on top of the other inside the guards. The width of the sickle blades at the rear edge is similar to that of the guard near the rear of its cutting edge. The blades of the top sickle are sharpened to cut against the top surface of the slot and the blades of the bottom sickle are sharpened to cut against the bottom surface of the slot. The two sickles are run out of phase, preferably about 90 degrees, so that as a result, when one sickle is near the end of its stroke within the guard where it decelerates, stops, then accelerates in the opposite direction, the other sickle is starting its cut against the side surface of the next guard.

12 Claims, 4 Drawing Sheets

US 6,962,040 B2

SICKLE KNIFE WITH DOUBLE OVERLAPPING OUT OF PHASE SICKLES

This application claims the benefit of Provisional Application No. 60/466,781, filed May 1, 2003.

BACKGROUND OF THE INVENTION

Reciprocating sickles have long been used as a cutting means for hay, grains, and many other crops. Such sickles generally comprise a series of knife guards mounted on a cutter bar and extending forwardly therefrom. The sickle bar carries a plurality of generally triangular knife blades which reciprocate back and forth across the knife guards which define two side edges causing a cutting action with the knife blades. Generally the reciprocation is arranged so that the blades move between a position aligned with one guard and a position aligned with the next causing a cutting action as they move therebetween.

It is known to provide two separate sickles which overlap only in the middle so as to reduce the stresses of driving a single very long sickle. However these arrangements only operate in effect over one half of the width.

It is also known to operate two overlapping sickles in opposite phase (or 180 degree phase difference), without the presence of stationary guard cutting surfaces, so that the cutting action occurs between the two reciprocating sickles rather than between one sickle and its cooperating stationary guards.

While reciprocating sickles have been very successful in low to moderate cutting speeds, they have been less successful when attempting to cut at high speeds, e.g. speeds in excess of 10 mph. Thus alternative forms of cutter have generally been employed at these speeds.

The inherent problem with a reciprocating knife is the fact the sickle moves back and forth in a sinusoidal pattern. As a result, after the sickle finishes a cut, it decelerates, stops, then accelerates in the opposite direction. During this time there is no cutting being done and crop is gathered between the guard points and bent forward until the sickle makes its next cut. Therefore increased travel speeds result is a ragged or long stubble.

SUMMARY OF THE INVENTION

It is one object of the invention to provide an improved sickle knife apparatus which may provide an enhanced cutting action at higher ground speeds.

According to one aspect of the invention there is provided a sickle knife apparatus for cutting a crop comprising:

a cutter bar arranged to be located at a position for moving through a crop to be cut;

a plurality of fixed knife guards mounted on the cutter bar and projecting forwardly therefrom;

a first sickle having a first bar extending substantially along the full length of the cutter bar and mounted for transverse reciprocation along the cutter bar relative to the fixed knife guards and including a plurality of first blades carried on the first bar along the length of the first bar;

each of the blades of the first sickle being movable back and forth, as the first bar is reciprocated, between a position at one knife guard and a position at a next knife guard, across a space between the two knife guards in a cutting action and each of the blades having left and right side cutting edges arranged for cooperation with right and left side surfaces of the knife guards in the cutting action;

a second sickle having a second bar extending substantially along the full length of the cutter bar and mounted for transverse reciprocation along the cutter bar relative to the fixed knife guards and including a plurality of second blades carried on the second bar at spaced positions along the length of the second bar;

each of the blades of the second sickle being movable back and forth, as the second bar is reciprocated, between a position at one knife guard and a position at a next knife guard, across a space between the two knife guards in a cutting action and each of the blades having left and right side cutting edges arranged for cooperation with right and left side surfaces of the knife guards in the cutting action;

wherein the first and second sickles are reciprocated at a phase difference different from 180 degrees so that, as each in turn of the first and second is sickles moves toward an end of its stroke and thus ceases its cutting action, the other of the first and second sickles is providing a cutting action.

Preferably the first and second sickles are arranged to reciprocate such that, as one of the first and second sickles moves toward an end of its stroke, a leading edge of the blades of the other of the first and second sickle follows behind a trailing edge of the respective blades of said one of the first and second sickles so as to define a space therebetween into which the crop can enter and the trailing edge of the blades of said one of the first and second sickles is arranged at the end of the stroke relative to the side surface of the respective knife guard such that the leading edge of the blades of the other of the first and second sickles effects a cutting action of the crop in said space relative to the side surface of the respective knife guard and not relative to the trailing edge. Thus it is preferred that the blades are arranged relative to the guards such that the cutting action occurs between the blades and the guards rather than between the blades. This allows the best cutting action and allows the blades to be sharpened or chamfered to provide a clean cutting action relative to the guards. However it is not essential that the cutting action between the blades be wholly prevented since the blades can be sharpened to provide a dual cutting action both at the top surface and the bottom surface thus allowing some cutting to occur between the blades.

Thus the two sickles provide a double cutting action thus in effect doubling the rate of cutting. However, the cutting action of each blade is preferably arranged to occur relative to the side surface of the respective knife guard and not between the blades. It will be appreciated in this regard that the sharpening or is chamfering of the blades is arranged to provide a cutting action relative to the surface of the knife guard against which the chamfered edge runs. If the blades are chamfered in a single direction and pinching of crop between the blades is allowed to occur, this may not be effectively cut and may jam or tear and may interfere with the efficiency of the cutting action.

Preferably each knife guard has on each of its left and right surfaces a top cutting edge and a bottom cutting edge and wherein the blades of the first sickle are sharpened or chamfered to cut against the bottom cutting edge of the guard and the blades of the second sickle are sharpened or chamfered to cut against the top cutting edge of the guard.

Preferably each of the knife guards has a guide slot therein through which both the first and second sickles pass. While this construction is much preferred, it is not essential to the operation and the knife guards can as an alternative be provided with two separate guide slots one above the other.

In this arrangement of a common slot, preferably each knife guard has on each of its left and right surfaces a top cutting edge defined at a top of the slot and a bottom cutting edge defined at a bottom edge of the slot and wherein the to blades of the first sickle are sharpened or chamfered to cut against the bottom cutting edge of the guard and the blades of the second sickle are sharpened or chamfered to cut against the top cuffing edge of the guard.

In this arrangement of a common slot, preferably the blades of the first sickle have a top surface spaced from the bottom cutting edge which runs in contact with a bottom surface of the blades of the second sickle. The first bar can then be underneath the first sickle and the second bar on top of the second sickle.

Preferably a maximum width of the blades of each of the first and second sickles is substantially equal to or less than the width of the knife guards at the blades such that the knife guards receive the blades wholly within the side surfaces thereof at the end of the stroke. This arrangement requires knife guards which are wider than the conventional guards to ensure that the whole of the blade is contained within its width. This arrangement is much preferred as it ensures that the blades are contained or confined within the guard sides when they stop and reverse so that the other blade which is cutting provides a cutting action with the side of the guard. As an alternative arrangement however, the width of the guards can be less than the width of the blades, but the stroke of the sickles is arranged longer than the spacing between the guards, known as over-stroking, so that the trailing edge is contained behind the side surfaces of the guard when the leading edge approaches that side surface.

Preferably the spacing between the knife guards is less than the width thereof at the maximum width of the blades.

Preferably the angle of phase difference is of the order of about 90 degrees since this provides in effect a symmetrical arrangement and provides the maximum spacing between the trailing and leading edges. However it will be appreciated that the phase angle can be changed from the optimum of 90 degrees in either direction so as to lie in the range of about 45 degrees to about 135 degrees depending upon speed of operation and cutting angles of the blades to obtain a similar effect while using the same concept and perhaps not operating at best efficiency.

Preferably the first and second sickles are arranged one directly superposed on the other, but again this is not essential to the operation since one sickle may be slightly in front of the other. Preferably the first and second sickles are carry the same size and angle of blades, but again this is not essential to the operation.

The result of this cutting action is a much improved cutting efficiency, resulting in higher cutting speeds.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
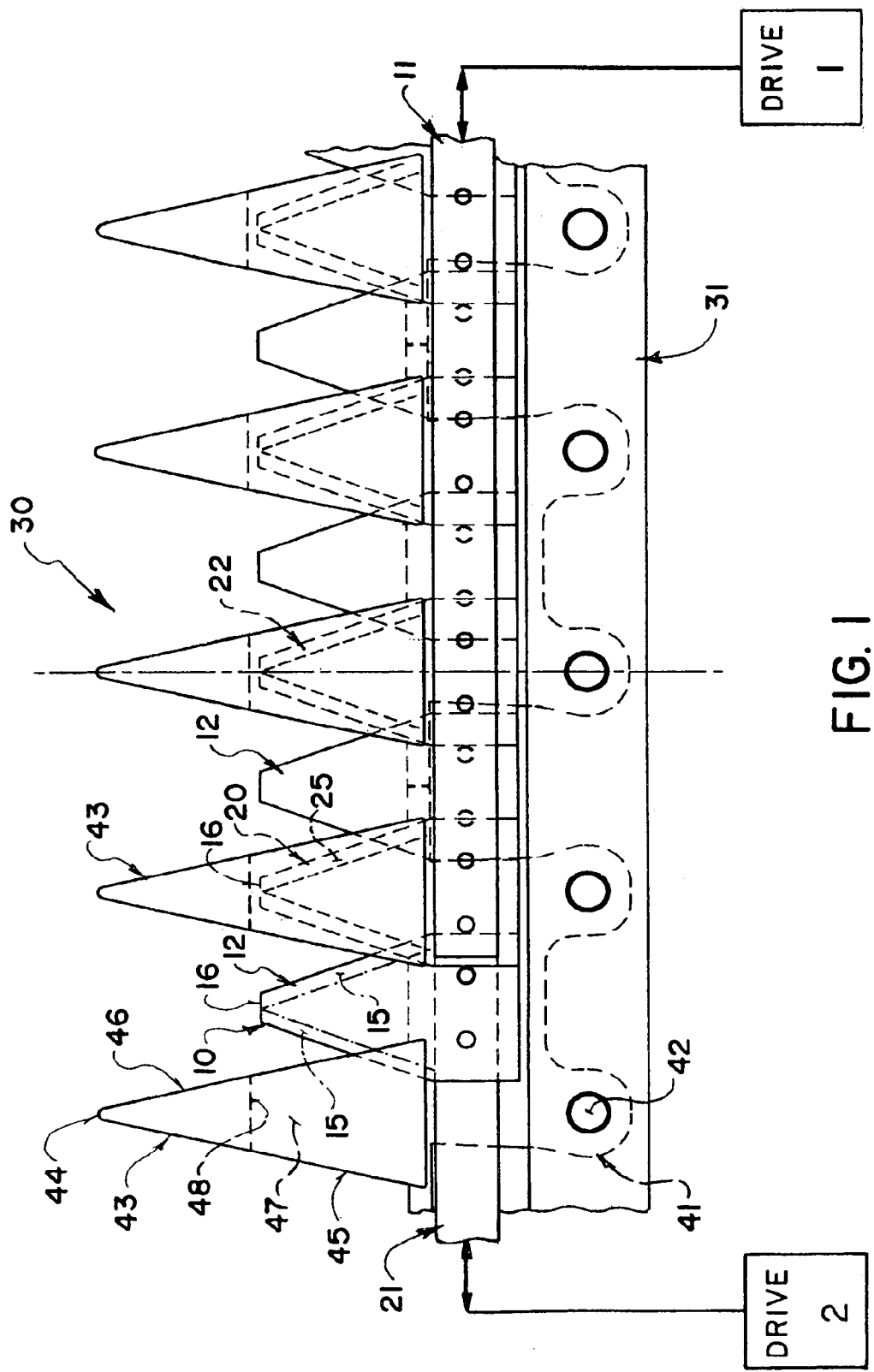
FIG. 1 is a top plan view of a portion of a sickle knife according to the present invention.
Figure 2:
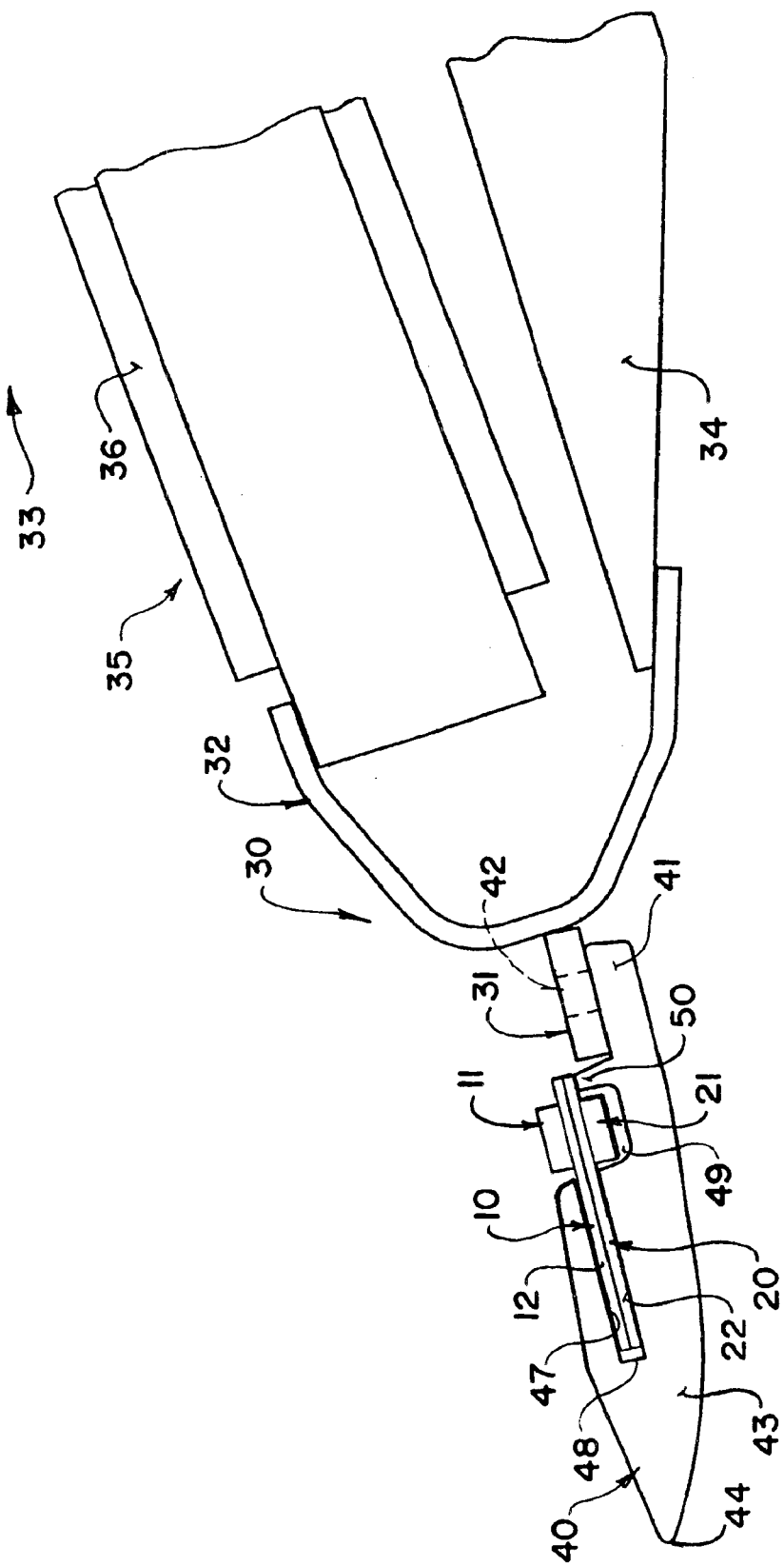
FIG. 2 is a cross sectional view through the sickle knife of FIG. 1.
Figure 3:
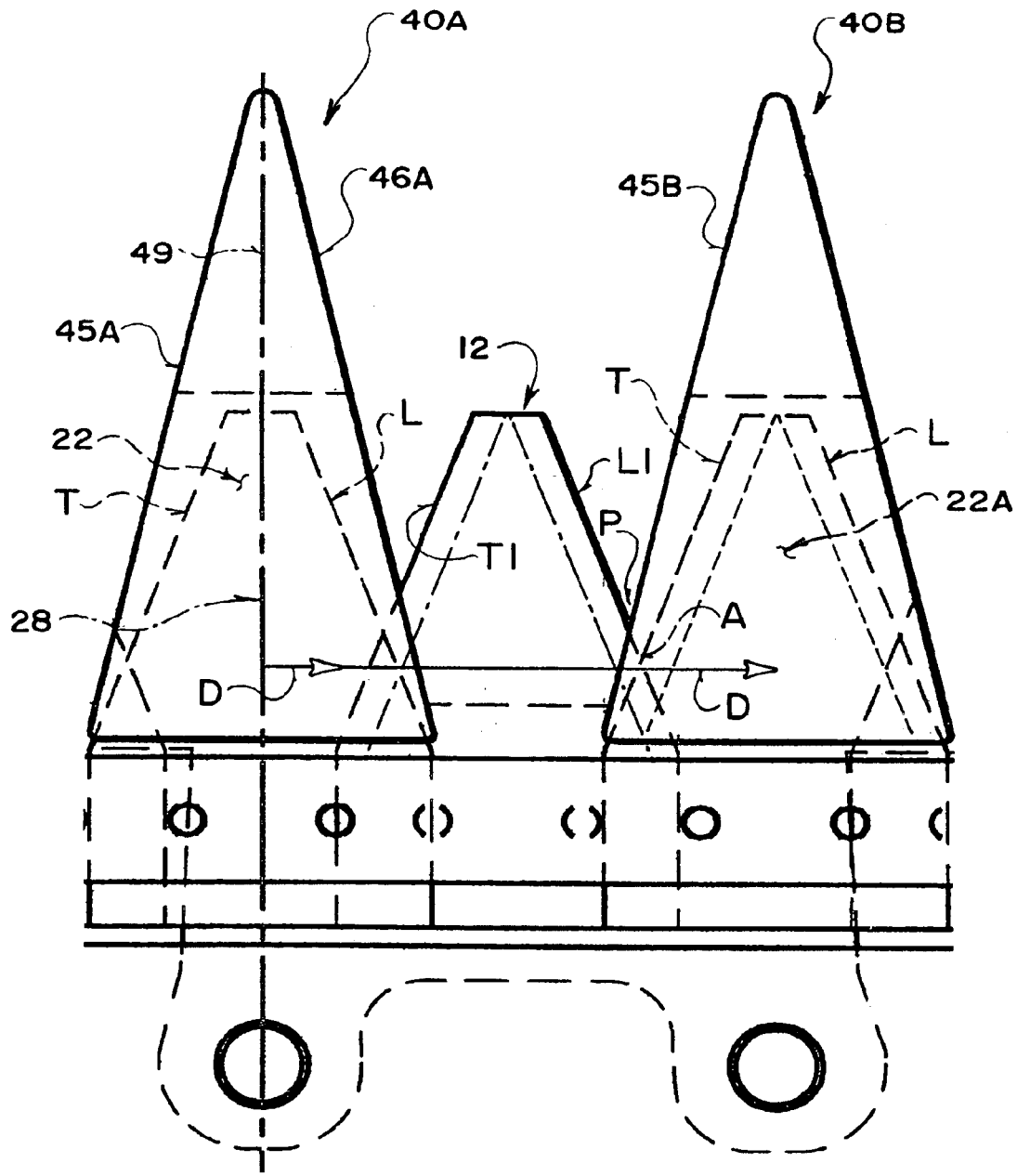
FIG. 3 is a top plan view similar to that of FIG. 1 on an enlarged scale showing the movement and operation of the blades.

In the embodiment shown in FIGS. 1, 2 and 3, a generally conventional cutter bar and sickle knife assembly is shown and the details of this are not included since the design of the cutter bar and sickle knife can be modified in accordance with many different requirements as is well known to one skilled in the art. In general the cutter bar 30 comprises an elongate bar member 31 to which the sickle knife is attached which is carried on a structural member 32 at the forward end of a crop harvesting machine 33. In the embodiment shown the cutter bar forms part of a header having header frame members 34 and the crop transport mechanism 35 in the form of a draper 36. However again the construction and arrangement of the header itself can vary in accordance with the type of equipment with which the sickle knife is to be used.

The sickle knife assembly comprises a plurality of knife guards 40 again of a conventional construction which are formed in side-by-side pairs bolted by a flange 41 to the bar 31 by bolts 42. From the flange 41, a pair of knife guard members 43 extend forwardly to a tip 44 spaced outwardly from the flange 41. The knife guard members extend from the tip rearwardly and outwardly to the sides so as to form side surfaces 45 and 46 of the knife guard. Within the body of the knife guard is formed a slot 47 which extends from a forwardmost edge 48 rearwardly to a guide channel 49 of the knife guard which is located forwardly of the flange 41 and separated from the flange 41 by a support projection 50.

Conventionally a single sickle 10 runs with a bar 11 within the channel 49 and generally triangular blades 12 extending from the bar 11 into the slot. Conventionally the side edges of the generally triangular blades are chamfered of sharpened so as to co-operate with the side surfaces 45 and 46 of the knife guards in a cutting action as the knife blades are reciprocated back and forth across the space between the guard members 43.

The reciprocating action driving the bar 11 is located at one end of the cutter bar 30 as indicated in FIG. 1 at Drive 1.

The shape and construction of the knife guards can also vary widely depending upon various circumstances and the arrangement shown in the figures is one example only which can be modified in accordance with the knowledge of one skilled in the art.

In the arrangement of the present invention, a second sickle 20 is provided which includes a second bar 21 and second knife blades 22. The first and second sickles in the embodiment shown are identical and symmetrical with the exception that one is inverted relative to the other so that the bar 11 is on the top of the blades 12 and the bar 21 is on the bottom of the blades 22. The second sickle is driven by a second drive as indicated at drive 2 in FIG. 1.

Each of the sickles is reciprocated by a stroke generally but not necessarily equal to the distance between the tips 44 of the guards so that each sickle blade reciprocates from a first position in which its center line is aligned with the center line of the first guard to a second position in which its center line is aligned with the next adjacent guard and then back to the first position.

The blades 12 of the first sickle which are at the top are sharpened to define a chamfered edge on the undersurface of the blades as indicated at 15 so that the sharpened edge runs against the top of the slot 47 and provides a cutting action at the top of the slot relative to the side surfaces of the guards.

Symmetrically the bottom blades 22 have a chamfered edge 25 for providing a cutting action relative to the bottom surface of the slot 47 against the side surfaces of the guards.

The bottom surface of the top blades 12 sits on the top surface of the bottom blades 22 in a sliding action as the sickles reciprocate. The height of the slot from the bottom surface of the slot to the top surface of the slot is slightly greater than twice the thickness of the blades so that the blades can pass through the slot in a sliding action as they are reciprocated one on top of the other.

In the embodiment shown, the width of the guard members between the side surfaces 45 and 46 is increased relative to that of conventional guards in that the width at the channel 49 is slightly greater than or equal to the widest point of the blades 12 and 22. The guards converge forwardly and inwardly toward the tip 44 but at a slightly reduced angle relative to the inclined side surfaces of the blades so that the forward edge 16 of the generally triangular blades is behind the front edge 48 of the slot and the sharpened edges of the blades are contained within the slot that is spaced inwardly from the side surfaces 45 and 46 of the guards.

Thus at the end of its stroke, each of the blades is wholly contained within and covered by the guard with neither of its cutting edges exposed beyond the side surfaces of the guard.

The two sickles are driven at a phase difference which in the embodiment shown is exactly 90 degrees.

Turning now to FIG. 3 for an explanation of the operation, in the position shown the blades 22 are at their end position so that a center line 28 of the blade lies on a center line 49A of the guard member. From that end position the sickle will reciprocate in the direction D to move from the center line of the guard 40A to a second end position at the center line of the guard 40B. As the blades 22 move toward the right in the direction D as shown, the leading blade edge L emerges from the side surface 46A passes across the space between the guards 40A and 40B and then commences a cutting action with the side surface 45B of the guard 40B. The blade has a trailing edge T which follows behind the leading edge in a movement toward: the side surface 45B.

Symmetrically the blades 12 reciprocate back and forth between the same locations but at a 90 degree phase difference so that the blades 12 trail behind the blades 22. Thus in a position shown in FIG. 3 the blade 22 is moved to a position 22A in which it is contained within the guard 40B and its trailing edge has just entered the guard so as to be contained wholly within the side surface 45B.

In this position the blade 12 is moving also in the direction D but is part way through its stroke toward the guard 40B the blade 12 has a leading edge L1 and a trailing edge T1. In view of the 90 degree phase difference, the leading edge L1 is spaced rearwardly of the trailing edge T so as to define a V-shaped space therebetween converging to an apex A.

It will be appreciated that this V-shape space moves across the space between the guards 40A and 40B as the blades 22 and 12 move in the direction D. the V-shaped space will however change in dimension as the relative speed of the sickles change during their stroke. In this regard, it will be noted that in most arrangements the sickles are driven in a sinusoidal manner so that they slow to a relatively slow speed at their point of reversal. Thus cutting is preferably effected during the high speed part of the movement when momentum of the sickle can avoid jamming or stalling of the blades if blunt or if engaging tough crop. For this-reason it is preferred that the guards are wide enough and arranged such that the blades are prevented from effecting a cutting action between them as this would occur while the stationary blade is just beginning to accelerate thus at the position of maximum possibility of stalling.

As the blade 22 moves into the area of the guard 40B, its trailing edge T is covered by or confined inside the surface 45B as the blade 22 at the position 22A decelerates and stops on the center line prior to accelerating in the reverse direction. Thus while the deceleration and stopping action occurs, the leading edge L1 of the blade 12 approaches the guard 40B and effects a cutting action between the leading edge L1 and the side surface 45B. Thus the cutting action of the blades is effected between the leading edge L1 and the side surface of the guard rather than between the leading edge L1 and the trailing edge T.

As the leading edge L1 moves toward the guard 40B, the actual cutting point P which is the intersection between the leading edge L1 and the side surface 45B moves outwardly along the side surface 45B thus cutting the material in the space between the leading edge L1 and the side surface 45B. The blade 22 after reaching the end of its stroke on the center line of the guard 40B starts to accelerate and move in the reverse direction so that its trailing edge T becomes the leading edge in the reverse operation. It is necessary therefore to ensure that the point P moves outwardly of the guard before the intersection of the edge T with the same surface 45B reaches the same position. Thus at all times during the cutting action, in the arrangement as shown, cutting occurs with the side surface 45B since that portion of the edge T which projects beyond the surface 45B is rearward of the point P.

As the further movement continues until the blade 12 is contained with the guard 40B, the blade 22 emerges from the guard 40B and its edge T which has become the leading edge moves toward the left across the blade 12 until it becomes exposed beyond the edge 45B and becomes a cutting edge which can co-operate with the side surface 46A of the guard 40A. The movement in the opposite direction is exactly symmetrical since the blade 12 will again move across the space between the guards at a phase delay relative to the blade 22. Again therefore, in this arrangement, the same co-operation will occur between the leading and trailing edges of the blades so that all cutting action of the leading edge of the blade will occur to relative to the side surface of the guard rather than relative to the other of the blades.

The geometry including the dimensions and angles of the guards and blades can vary from that shown provided that the concept remains in effect as substantially all of the cutting action of the double sickle blades occurs between the leading blade edge and the side of the guard rather than between the blades themselves.

The arrangement shown in the figures is much preferred since it is directly symmetrical and since the blades reciprocate by a distance equal to the spacing of the center lines of the guards. At the ends of the stroke of the blades, therefore, the blades are wholly contained within the guards so that there is less opportunity for crop to engage edges of the blades except in situation where the edge of the blade is in movement toward a cutting action.

However the construction as shown can be modified while using the same above concept. Thus the guards are not necessarily wider than the blades provided that the trailing edge of the blade is covered by or confined within the side surface of the guard as the leading edge of the next blade follows behind it in its cutting action. Thus the guards can be narrower than the blades. However it is desirable that the movement of the blade is such that the trailing edge is moved to a position wholly within the guard as the next leading edge approaches. This can be obtained by the leading edge of the blade projecting beyond the other side of the guard. This however requires a stroke of movement of the sickles which is greater than the spacing between the center lines of the guards, which may not be desirable.

Careful attention to the necessary geometry including the angles of the leading and trailing edges and the side surfaces is desirable for best efficiency to ensure that the cutting action occurs as set forth above.

While the guards are shown in pairs, this arrangement is not necessary and single or multiple guards may be provided.

While it is much preferred that the blades are running immediately in sliding contact through a single slot so that one blade co-operates with the top of the slot and the other blade co-operates with the bottom of the slot, this arrangement is not essential and it is possible for the guard to have two slots and for the blades to be spaced by the distance between the slots.

Figure 4:
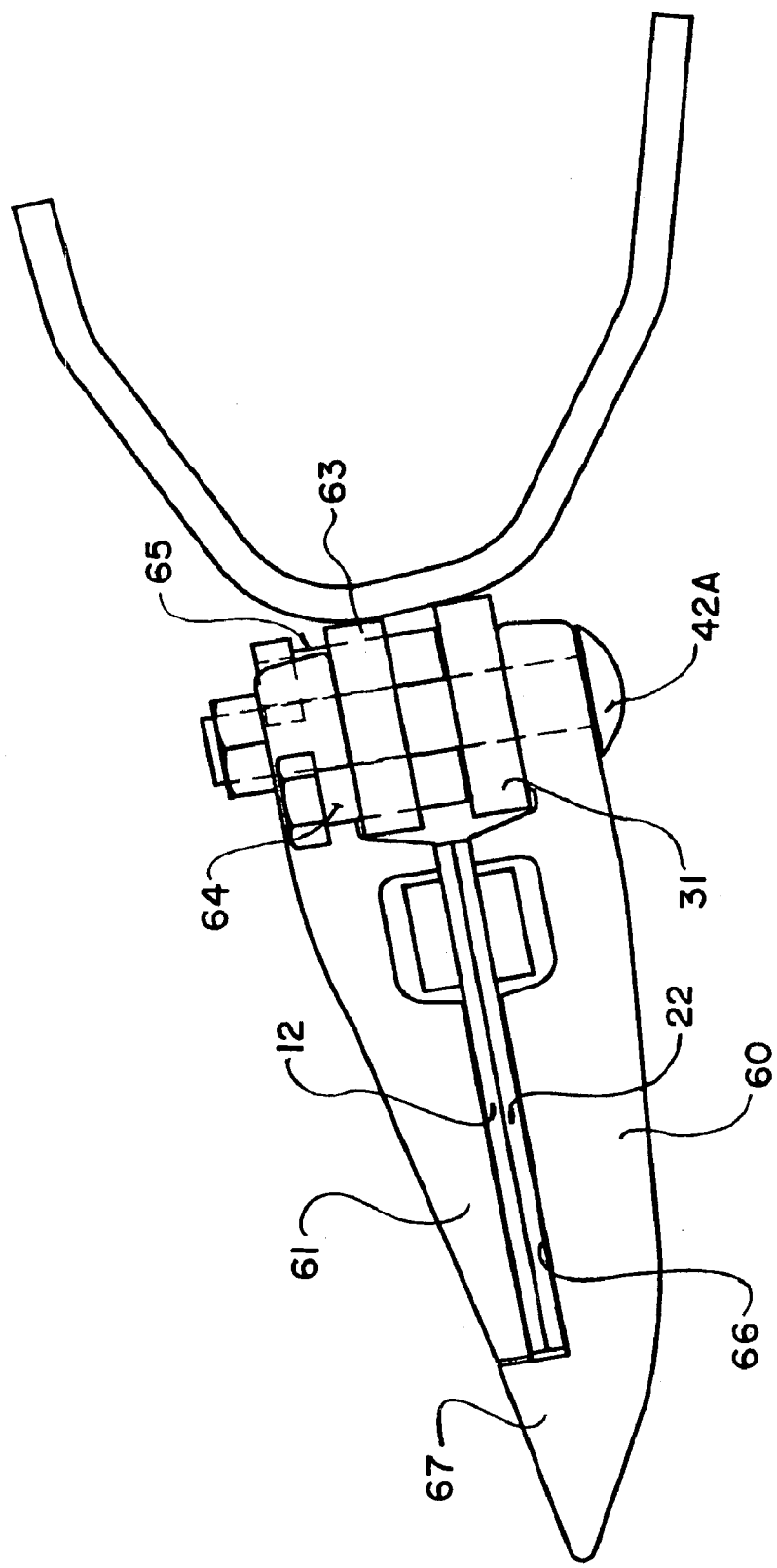
FIG. 4 is a cross sectional view through an alterative form of guard which can be used in replacement for the guard of FIG. 2.

In FIG. 4 is shown an alterative form of guard which can be used in replacement for the guard of FIG. 2. In this embodiment the guard is of the type formed in two pieces with a bottom guard portion 60 mounted on the cutter bar 31 by bolts 42A. An upper guard portion or hold down 61 holds the blades 12 and 22 in their superposed positions as previously described. The upper portion 61 is clamped onto a bar 63 by the bolt 42A. Adjustment of the bar 63 relative to the cutter bar 31 can be obtained in conventional manner by adjusting set screws 64 and 65. This adjusts the spacing and angle of the upper portion 61 relative to the lower portion 60 so as to adjust the width and angle of the slot 66 defined therebetween. The lower portion 60 carries the nose 67 in front of the guard with the forward end of the upper portion terminating at the forward end of the slot 66 and just behind the nose 67. This arrangement may be desirable to obtain easier adjustment of the slot 66 to best guide and receive the superposed blades which run in contact on their inner surfaces but cut relative to cutting edges at the top and bottom of the slot 66 as previously described.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

What is claimed is:

1. A sickle knife apparatus for cutting a crop comprising:
   a cutter bar arranged to be located at a position for moving through a crop to be cut;
   a plurality of fixed knife guards mounted on the cutter bar and projecting forwardly therefrom;
   a first sickle having a first bar extending substantially along the full length of the cutter bar and mounted for transverse reciprocation along the cutter bar relative to the fixed knife guards and including a plurality of first blades carried on the first bar along the length of the first bar;
   each of the blades of the first sickle being movable back and forth, as the first bar is reciprocated, between a position at one knife guard and a position at a next knife guard, across a space between the two knife guards in a cutting action and each of the blades having left and right side cutting edges arranged for cooperation with right and left side surfaces of the knife guards in the cutting action;
   a second sickle having a second bar extending substantially along the full length of the cutter bar and mounted for transverse reciprocation along the cutter bar relative to the fixed knife guards and including a plurality of second blades carried on the second bar at spaced positions along the length of the second bar;
   each of the blades of the second sickle being movable back and forth, as the second bar is reciprocated, between a position at one knife guard and a position at a next knife guard, across a space between the two knife guards in a cutting action and each of the blades having left and right side cutting edges arranged for cooperation with right and left side surfaces of the knife guards in the cutting action;
   wherein the first and second sickles are reciprocated at a phase difference different from 180 degrees so that, as each in turn of the first and second sickles moves toward an end of its stroke and thus ceases its cutting action, the other of the first and second sickles is providing a cutting action.

2. The apparatus according to claim 1 wherein the first and second sickles are arranged to reciprocate such that, as one of the first and second sickles moves toward an end of its stroke, a leading edge of the blades of the other of the first and second sickle follows behind a trailing edge of the respective blades of said one of the first and second sickles so as to define a space therebetween into which the crop can enter and wherein the trailing edge of the blades of said one of the first and second sickles is arranged at the end of the stroke relative to the side surface of the respective knife guard such that the leading edge of the blades of the other of the first and second sickles effects a cutting action of the crop in said space relative to the side surface of the respective knife guard and not relative to the trailing edge.

3. The apparatus according to claim 1 wherein each knife guard has on each of its left and right surfaces a top cutting edge and a bottom cutting edge and wherein the blades of the first sickle cut against the bottom cutting edge of the guard and the blades of the second sickle cut against the top cutting edge of the guard.

4. The apparatus according to claim 1 wherein each of the knife guards has a guide slot therein through which both the first and second sickles pass.

5. The apparatus according to claim 4 wherein each knife guard has on each of its left and right surfaces a top cutting edge defined at a top of the slot and a bottom cutting edge defined at a bottom edge of the slot and wherein the blades of the first sickle are sharpened to cut against the bottom cutting edge of the guard and the blades of the second sickle are sharpened to cut against the top cutting edge of the guard.

6. The apparatus according to claim 5 wherein the blades of the first sickle have a top surface spaced from the bottom cutting edge which runs in contact with a bottom surface of the blades of the second sickle.

7. The apparatus according to claim 1 wherein each of the knife guards has two separate guide slots one above the other with one receiving the blades of the first sickle and the other receiving the blades of the second sickle.

8. The apparatus according to claim 1 wherein a maximum width of the blades of each of the first and second sickles is substantially equal to or less than the width of the knife guards such that the knife guards receive the blades within the side surfaces thereof at the end of the stroke.

9. The apparatus according to claim 1 wherein the knife guards define rear corners and the spacing between the knife guards at the rear corners is less than the width thereof at the rear corners.

10. The apparatus according to claim 1 wherein the angle of phase difference is of the order of about 90 degrees.

11. The apparatus according to claim 1 wherein the angle of phase difference is in the range of about 45 degrees to about 135 degrees.

12. The apparatus according to claim 1 wherein the first and second sickles are arranged one directly superposed on the other.

* * * * *